Patented Jan. 15, 1935

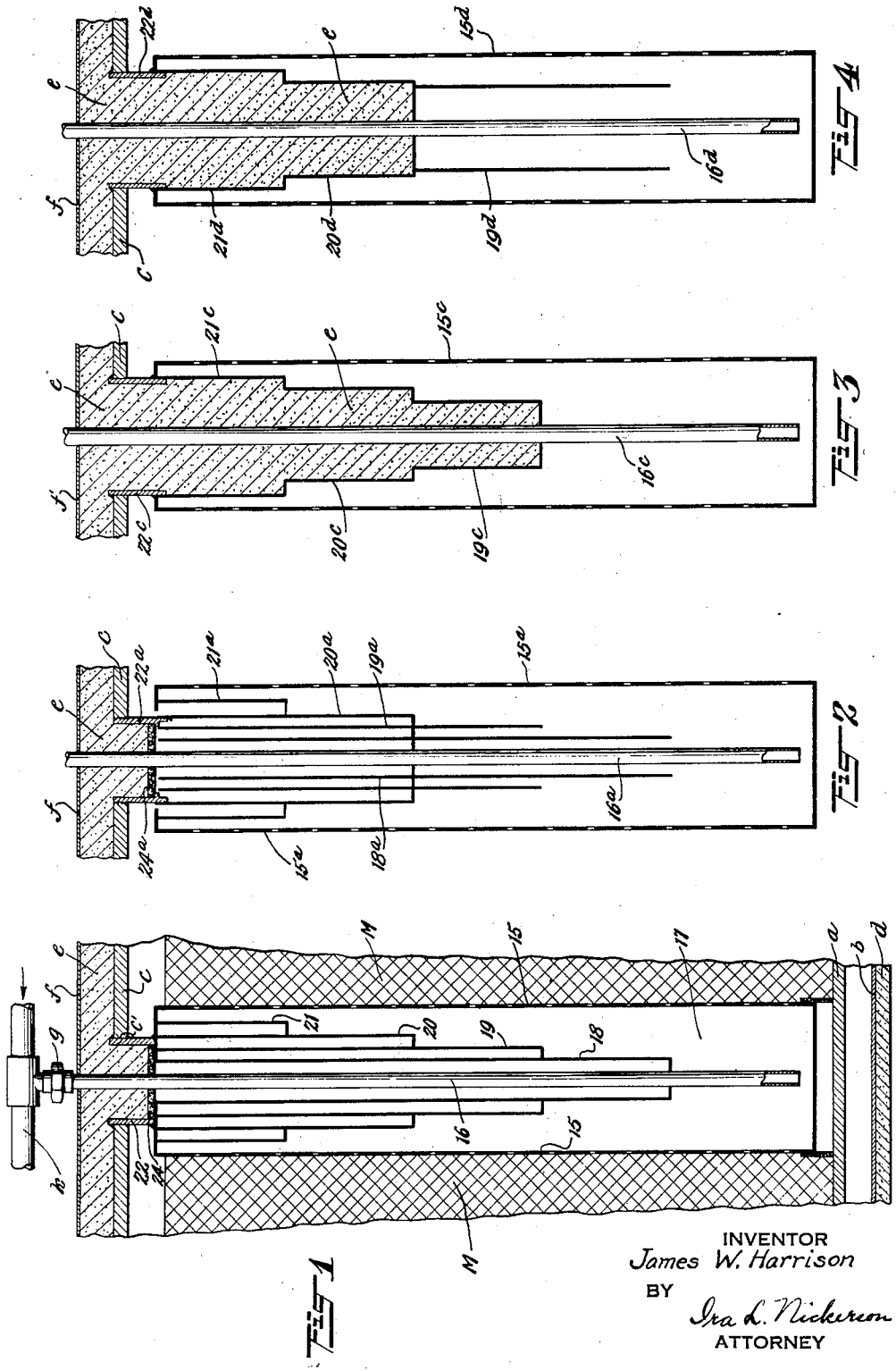

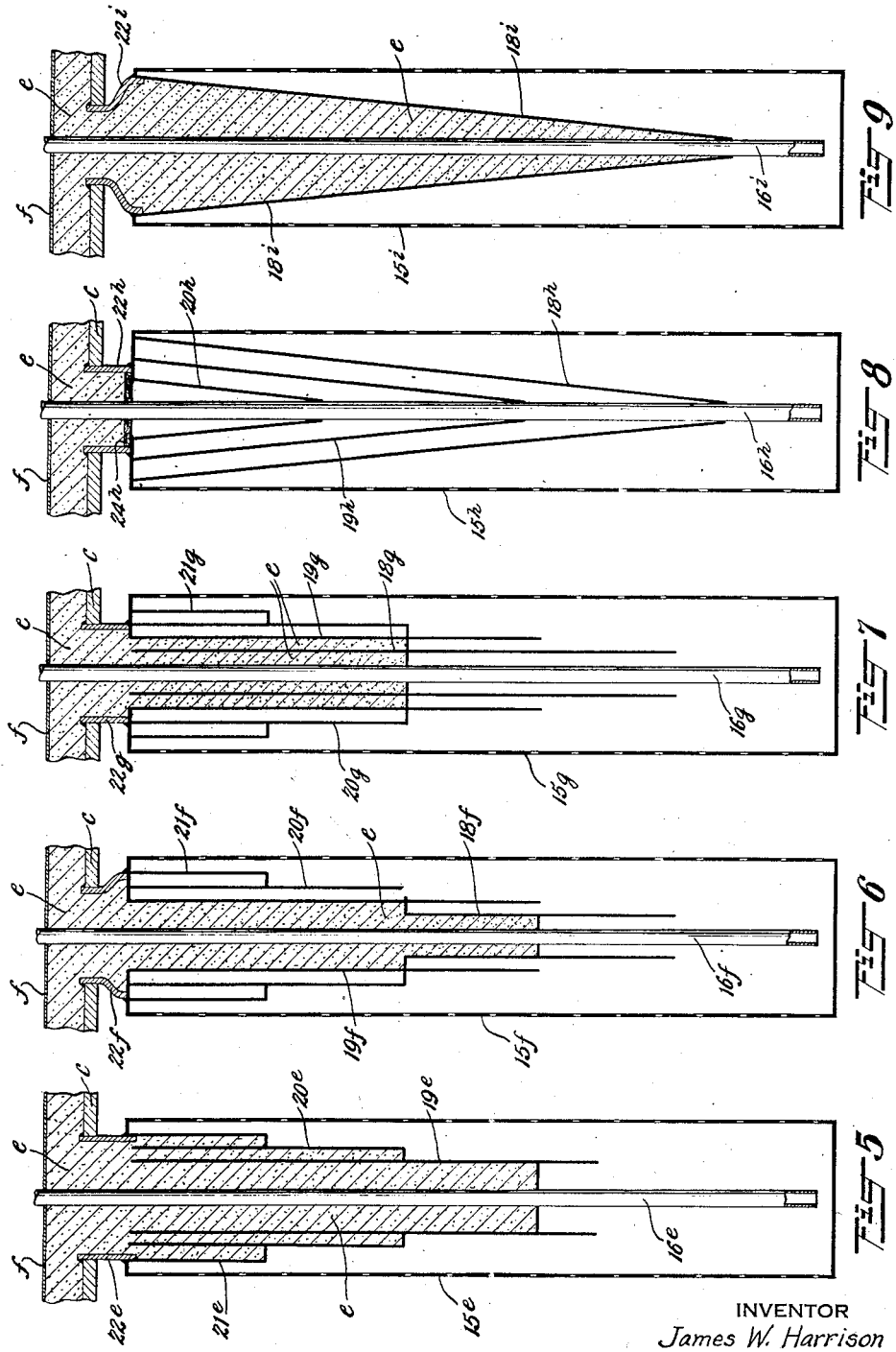

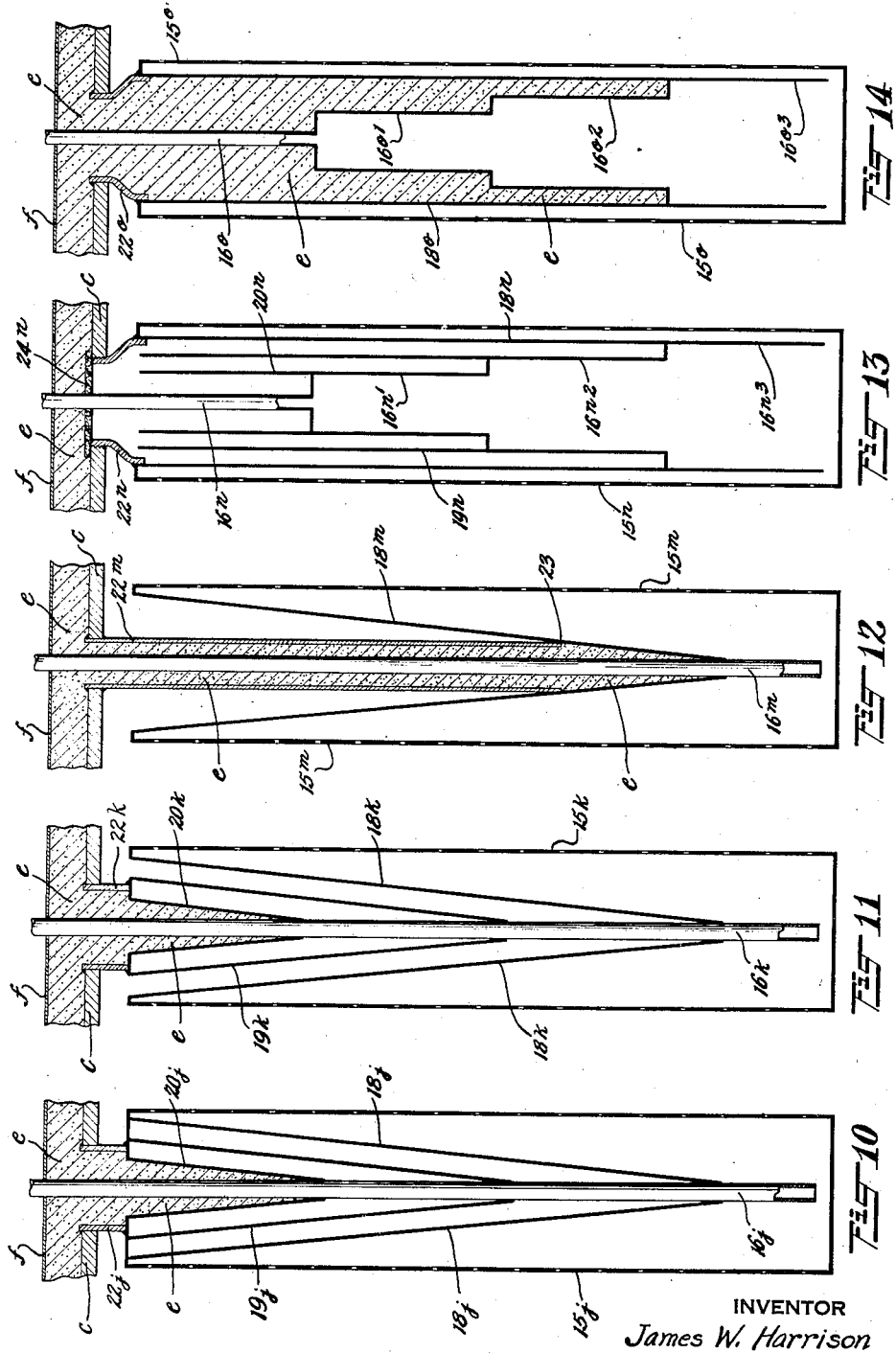

1,987,933

UNITED STATES PATENT OFFICE 1,987,933

CONTROL OF HEAT EXCHANGE

James W. Harrison, Woodbury, N. J., assignor to Houdry Process Corporation, Dover, Del., a corporation of Delaware Application August 24, 1932, Serial No. 630,262

43 Claims. (Cl. 23—288)

This invention relates to heat exchange and to the control of the same, especially exchange between a contact mass and an entering fluid. The heat transfer may be either to or from the fluid. The fluid may or may not be brought into direct contact with the mass. While involving features of general application, the invention is particularly important in cases where a contact mass is to be maintained at all points at a substantially constant temperature, or where the temperature of the mass must be uniformly raised or lowered. In certain aspects, the invention is an improvement upon, or further development of, the invention disclosed and claimed in the copending application of Thomas B. Prickett and Eugene J. Houdry, Serial No. 612,222, filed May 19, 1932.

One object of the invention is to devise ways and means for the control of heat exchange between a mass and a fluid passing into or through the mass so as to effect uniform heat transfer. Another object is to avoid "spotty" or irregular transfer with resulting cold areas and variable temperature within the mass. Another object is to devise apparatus adaptable to temperature differences extending over a wide as well as a narrow range. Other objects will be apparent from the detailed description which follows.

In heat exchange, all the methods of heat transfer, namely radiation, conduction and convection, require consideration. The relative importance of these factors will vary since they depend to a large extent upon the material used for the contact mass and upon the character of the apparatus through which the heat exchange is effected. If the contact mass is of metal, conduction may be the predominating factor. With other material of low conductivity, such as hydrosilicate of alumina or a composite material which is largely non-metallic, radiation may be most important. The role played by convection depends upon the structure of the apparatus, and in some cases is quite negligible.

In effecting chemical changes by the use of a contact mass, success is largely a matter of temperature control. If the temperature goes above or below a certain range, the reaction may be unduly accelerated or decelerated, or stopped entirely. Hence it is essential that provision be made for holding the contact mass at any desired temperature and for keeping the entire mass at the same temperature during transitions from one reaction temperature to another. This requires that the fluid or fluids by which temperature control is effected shall take heat from or impart heat to the contact mass in a substantially uniform manner throughout the mass. The problem then resolves itself into a question of heat exchange and of distribution of a fluid. In accordance with the present invention, the fluid is arranged to pick up heat from or impart heat to the contact mass uniformly and progressively. This is effected without direct physical contact of the two. Then, when the fluid is at a predetermined temperature somewhat below or above that of the mass (depending upon the kind of reaction in progress), direct but uniform distribution of the fluid may be made throughout the mass. One form of apparatus adapted for practical use is a nested conduit construction of the general type disclosed in the aforesaid copending application Serial No. 612,222. Many structural arrangements and modifications may be provided to create the graduated transfer of heat between the entering fluid and the contact mass including baffles alone, insulation alone, or a combination of baffles and insulation.

In order to illustrate the invention, concrete embodiments thereof are shown in the accompanying drawings, in which:

Fig. 1 is a sectional view of a distributing unit embedded in a contact mass, portions of the container for the contact mass and of certain associated parts being also shown in section;

Figs. 2 to 14 inclusive illustrate modified forms of the distributing unit.

Fig. 1 indicates a fractional portion of a casing containing a contact mass M within which is embedded one of the distributing units of the present invention. The contact mass M may be of any known material for producing the desired effect upon the substance or substances brought into contact therewith. Accordingly, it may be merely inert material, such as gravel or stones for breaking up or retarding the flow of the fluid, or it may be inert absorbent material for taking up fluid, or it may possess catalytic activity. The distributing unit embedded in the mass may serve to cool or to heat the mass, in which case the heat exchange fluid may or may not be brought into direct contact with the mass. Or the unit may serve to distribute throughout the mass at a uniformly controlled temperature one or more substances, some or all of which may take part in the reaction, or the unit may withdraw the products of the reaction. The unit may also be used to distribute a fluid for cleaning or purifying the contact mass, or for regenerating or reactivating the mass, if it possesses catalytic activity.

As indicated in Fig. 1, the mass M is supported by a plate $a$ between the bottom and top headers $b$ and $c$, respectively, of the casing or container. Top header $c$ may have an opening $c'$ in which a portion of the distributing unit may be secured as will be presently described. The casing may be suitably insulated against heat losses by insulation $d$ on lower header $b$ and insulation $e$ on upper header $c$, and there may be an outer cover, such as $f$, to protect the insulating material.

A unit of the type herein disclosed comprises an outer tubular member 15, having closed ends normally out of contact with mass M, and side walls contacting the mass, all of which parts may be imperforate save for a discharge connection at some convenient point, if heat exchange alone is to be effected. When the fluid is to be discharged directly into mass M the side walls will be perforated in a substantially uniform manner throughout their length as indicated. The fluid is admitted to the unit by a conduit 16, which extends within member 15 substantially the length of the latter, and has an open end terminating adjacent the closed end of member 15, so that the admitted fluid must pass the length of member 15 before it is admitted into chamber 17 between the two nested conduits. In this chamber is located the means for restricting and controlling heat transfer from mass M to the entering fluid. In Fig. 1, such means comprise a series of stepped and progressively overlapping baffles 18, 19, 20 and 21, the innermost one, 18, being connected to conduit 16 adjacent its lower end, while the others are connected, one to another, in stepped relation. All of the baffles are joined together and to outer member 15 at the top, so that member 15, conduit 16 and the baffles form a unit. The sole direct connection for heat conduction between member 15 and conduit 16 is by baffle 18. A sleeve or nipple 22 is connected to the baffles and extends in spaced parallelism with conduit 16. In mounting the unit in the container for the contact mass, nipple 22 is pushed through opening $c'$ in upper header $c$ and then suitably secured in place as by welding. This is done, of course, before the lower end of the container is closed and before the insulation is applied. Conduit 16 extends out beyond insulating material $e$ and cover $f$, and may be connected by coupling $g$ or otherwise to a manifold $h$. A gasket 24 within nipple 22 permits the insulating material to extend down within the latter, but prevents it from extending within the baffle members.

In the form of the invention shown in Fig. 2, the same number of baffles is used as shown in Fig. 1, but baffles 18a and 19a are connected to each other and to conduit 16a at the lower end of baffle 20a. The latter carries the retaining nipple 22a which, in this instance, has a screw-threaded connection with top header $c$. Baffle 21a is secured to baffle 20a and to outer member 15a, but has no direct connection with nipple 22a. The upper and lower ends of baffles 18a and 19a are free, forming a reversed baffle arrangement. A gasket 24a supports insulating material within nipple 22a, as in Fig. 1. It will be apparent that much greater selectivity in the control of the heat flow between outer member 15a and conduit 16a is secured by the arrangement shown in Fig. 2, as compared with that shown in Fig. 1. By making the supporting nipple 22a an extension of only one of the baffles, dead air spaces are left on both sides. The baffle selected to carry the nipple is preferably one whose bottom connecting to the inlet conduit is adjacent to the hottest or coldest part of the contact mass. Thus the heat which is to be delivered or taken away can travel by conduction to or from the top of the baffle while the other baffles and the dead air spaces therebetween retard heat transfer by radiation and convection. This principle of control is applicable to many of the modifications presently to be described and has been applied to certain of them, notably Figs. 5, 11, 12 and 13.

In Fig. 3, heat exchange is restricted by stepped layers of insulation surrounding inner conduit 16c. For convenience in manufacture, a sleeve having stepped enlargements 19c, 20c and 21c is extended over conduit 16c, with its lower end secured to the latter, while its upper end is secured to outer member 15c. Nipple 22c is secured at the upper end and fastens the unit in place by a welded connection with upper header $c$, as in Fig. 1. There is no restriction, however, for the insulating material within the nipple 22c. On the contrary, the insulating material is forced within the expanded sleeve, as indicated, so that the heat transfer to conduit 16c is much restricted as the fluid enters the unit, but is progressively less restricted through reduction in the thickness of the insulating layer as the lower end of the conduit is approached.

In Fig. 4, the expanded sleeve is shorter than in the form shown in Fig. 3, and has only two steps, namely 20d and 21d, but a baffle 19d, of slightly less diameter than 20d, is suspended from the stepped sleeve, to cut the heat transfer below the insulated zone.

In Fig. 5, we have a series of three overlapping baffles, namely 19e, 20e and 21e. Baffle 19e has an extension with a free end beyond its point of connection to conduit 16e. Baffle 21e is in direct line with nipple 22e, to which it is secured as well as to outer member 15e. The concentric annular chambers formed by baffles 19e, 20e and 21e are all filled with insulating material $e$, with the exception of the reversed extension at the lower end of baffle 19e.

Fig. 6 shows a form of unit which combines a stepped insulating sleeve with reversed baffles. The insulating sleeve has steps 18f and 19f, both of which have baffle extensions depending therefrom. In addition, there is an outer baffle 20f carrying a stepped baffle 21f. The upper end of insulated step 19f is joined to baffles 20f and 21f and to outer member 15f. Nipple 22f is connected to the unit in line with baffle 21f, and thereafter is contracted for engagement with the opening in upper header $c$.

The modification shown in Fig. 7, in general, resembles the structure shown in Fig. 2, in that conduit 16g has reversed baffle members 18g and 19g but the upper portions are filled with insulating material $e$. Baffles 20g and 21g, however, are joined at the top with baffle 19g and outer member 15g for increased conductivity.

The forms heretofore described provide for progressive reduction of the chamber between the outer tubular member and the inner supply conduit as the upper end of the unit is approached. The next four forms to be discussed provide also for a reduction of the chamber in this direction, but the reduction is produced uniformly and progressively, rather than by steps or stages. This result is secured by a conical arrangement of baffles and sleeves for insulating material.

In Fig. 8, inner conduit 16h has flaring baffles 18h, 19h and 20h in reversed disposition from that disclosed in the previous figures. Each of these baffles is secured, at its lower end, directly to conduit 16h, and the upper ends are joined together, as well as to outer member 15h and to nipple 22h. Insulating material e is restricted to the extent of nipple 22h by a gasket member 24h.

In Fig. 9, a conical, uniformly expanding sleeve 18i is secured to conduit 16i near its lower end, and flares upwardly therefrom until it joins the upper end of outer member 15i and nipple 22i. The conical sleeve is filled, throughout its length, with insulating material e.

Fig. 10 is similar to the modification shown in Fig. 8, except that the gasket supporting the insulating material within nipple 22j is omitted, with the result that the insulating material extends within conical baffle 20j.

To avoid the excessive heat exchange by conduction which may result between the upper portion of the outer member and the inner conduit, in the forms shown in Figs. 8 and 10, the principle discussed in connection with Fig. 2 may be applied as illustrated in Fig. 11, wherein baffle 18k alone is connected both with conduit 16k at its lower end and with outer member 15k at its upper end, thus leaving an air space between baffles 18k and 19k. Baffles 19k and 20k are connected together at their upper ends and to nipple 22k, baffle 20k being filled with insulating material e.

Fig. 12 illustrates another application of the aforesaid principle. A baffle 18m is secured, at its lower end, to inner conduit 16m, flares outwardly therefrom uniformly, and joins outer member 15m at its upper end. Nipple 22m, in this instance, is of smaller diameter than in the previous figures, and is elongated to telescope over conduit 16m for a desired portion of the length of the distributing unit, being connected at 23 to the interior wall of baffle 18m in any suitable manner, as by welding. Insulating material e fills the space between nipple 22m and conduit 16m, and also the interior of baffle 18m below its joint 23 with nipple 22m.

The modifications of the invention shown in Figs. 13 and 14 mark a departure from the forms heretofore shown, in that the inner conduit is no longer uniform in size, but the heat baffling arrangement is such as to produce substantially the same effect. Instead of making the steps in baffles or sleeves surrounding the inner conduit, the steps are made in the conduit itself, with the result that the chamber between the conduit and the outer member is reduced substantially the same amount throughout its length.

Referring now to Fig. 13, it is to be noted that the upper end 16n of the inner conduit is of the same size as in the other figures, but that it has progressive expansions 16n', 16n² and 16n³. A long baffle 18n extends from step 16n³, a shorter baffle 19n from step 16n² and a still shorter baffle 20n from step 16n'. The upper ends of baffles 19n and 20n are free, while baffle 18n joins with outer member 15n and with nipple 22n. A gasket 24n, resting on the top of upper header c, keeps insulating material e out of nipple 22n and out of the chambers formed by the baffle members, but it is obvious that this arrangement can be readily varied.

In the form shown in Fig. 14, the inner conduit has a small upper end 16o and progressively enlarged steps 16o', 16o² and 16o³, as in Fig. 13. A single sleeve 18o extends from step 16o³, and, at its upper end, is secured to the top of outer member 15o and to nipple 22o. In this case, no gasket is used, and the insulating material e fills the entire space within nipple 22o and between the stepped inner conduit and sleeve 18o.

It is to be understood that the drawings are illustrative and diagrammatic rather than limiting. In designing heat exchange or distributing units for any given contact mass, a number of factors require special attention in determining upon dimensions, especially the extent and amount of baffling in both axial and transverse directions. Most important of such factors are: (1) rate of feed of fluid; (2) temperature of fluid entering the unit; (3) temperature of fluid leaving the unit; (4) temperature in the zone surrounding the unit; (5) material of which the unit is constructed. It is obvious that the number of units used will depend upon the size of the contact mass and that any suitable and additional means may be provided for feeding fluids to, or venting or withdrawing fluids from, the contact mass.

From the above disclosure it will be apparent that the present invention is susceptible of many modifications and variations to adapt apparatus utilizing a contact mass to a wide variety of operating and heat exchange conditions, and that in these modifications all of the factors of heat exchange can be utilized to the best advantage for each particular case. Radiation can be controlled either by baffles or by insulation, or by a combination of the two. The connections of the baffles with the inner conduit, on the one hand, and with each other and the outer member, on the other hand, determine the extent and point of heat exchange by conduction. Convection is controlled by the spacing of the baffles, and by the use or absence of solid insulating material.

While the heat controlling or baffling means have been herein disclosed as definitely associated with the inner member or conduit, which is the preferred arrangement, it is to be understood that they may be attached to or in close association with the outer member without departing from the nature or scope of the present invention as defined in the appended claims.

I claim as my invention:

1. The combination with a contact mass of fluid distributing apparatus embedded therein comprising a hollow distributor having apertured walls, a conduit within said distributor for admitting fluid thereto, and means limiting heat exchange between the mass and the fluid while the latter is within said conduit to a substantially uniform amount per unit of length of said conduit.

2. The combination with a contact mass of fluid distributing apparatus therefore comprising a hollow distributor having apertured walls, a conduit within said distributor for admitting fluid thereto, and baffle means interposed between said distributor and said conduit to limit the heat transfer to or from said fluid to a substantially uniform amount per unit of length of said conduit.

3. The combination with a contact mass of fluid distributing apparatus therefor comprising a hollow distributor having apertured walls, a conduit within said distributor for admitting fluid thereto, and stepped baffle means on said conduit to effect progressive limitation of the heat transfer between the mass and the fluid.

4. The combination with a contact mass of fluid distributing apparatus therefor comprising a hollow distributor having apertured walls, a conduit within said distributor for admitting fluid thereto, and means combining baffles and insulating material to facilitate progressively the heat transfer between the fluid and the mass.

5. In heat exchange apparatus, inner and outer tubular members in nested arrangement, said outer member having openings throughout its length and a closed end, said inner member having an open end near the closed end of said outer member, and means in the space between said members progressively facilitating heat exchange between said members as one end of said inner member is approached.

6. In heat exchange apparatus, inner and outer tubular members in nested arrangement, said inner member serving to admit fluid to the space between said members, means in said space for progressively facilitating heat transfer to the entering fluid, said means connecting with said inner member intermediate its ends and with said outer member at one extremity thereof.

7. A heat exchange unit to be embedded in a contact mass for controlling chemical reactions comprising inner and outer members in nested arrangement providing a space therebetween, and means in said space interconnecting said members and limiting the heat transfer to well defined steps or stages.

8. A heat exchange unit to be embedded in a contact mass for controlling chemical reactions comprising inner and outer members in nested arrangement providing a space therebetween, means in said space interconnecting said members to determine the quantity and place of transfer of heat by conduction, and additional means in said space for progressively modifying the heat exchange between said members.

9. A heat exchange unit to be embedded in a contact mass for controlling chemical reactions comprising inner and outer members in nested arrangement providing a space therebetween and a series of spaced baffles surrounding said inner member for selectively varying the heat transfer between said members.

10. A heat exchange unit to be embedded in a contact mass for controlling chemical reactions comprising inner and outer members in nested arrangement for providing a space therebetween and a series of spaced overlapping baffles encircling said inner member, one of said baffles being secured to both said members.

11. A heat exchange unit to be embedded in a contact mass for controlling chemical reactions comprising inner and outer conduits of uniform size in nested spaced relation, and heat exchange-controlling means between said conduits and secured to both.

12. In heat exchange apparatus, inner and outer members in nested arrangement providing a space therebetween, differential heat baffling means occupying a portion of said space and secured to non-registering portions of both said members.

13. A heat exchange unit to be embedded in a contact mass for controlling chemical reactions comprising inner and outer members in nested arrangement providing a space therebetween and a series of spaced overlapping baffles encircling said inner member, one of said baffles being secured to one end of one of said members and to an intermediate portion of the other of said members.

14. A heat exchange and fluid distributing unit adapted to be embedded in a contact mass for discharging fluid therewithin at a plurality of points comprising an inner conduit and an outer perforated tubular member, said member and said conduit being in nested arrangement to provide an annular space therebetween, and means progressively restricting said space for controlling heat exchange between said members.

15. A heat exchange and fluid distributing unit comprising inner and outer members in nested arrangement providing space therebetween, said outer member having perforations therethrough, stage or stepped heat controlling means in said space progressively reducing said space toward one end of the unit.

16. A heat exchange unit comprising inner and outer members in nested arrangement providing space therebetween, staged or stepped heat controlling means in said space progressively reducing the same toward one end of the unit, said means being secured to said inner member intermediate its length and providing a baffle encircling said last named member and extending in spaced relation thereto beyond said point of attachment of said means to said inner member.

17. In heat exchange apparatus, inner and outer members in nested arrangement providing a space therebetween, heat baffling means within said space, said means extending in both directions from a point of attachment of the same to said inner member intermediate its ends, one end of said outer member being attached to said inner member only through a portion of said means.

18. In heat exchange apparatus, inner and outer members in nested arrangement providing a space therebetween, heat baffling means within said space, said means extending in both directions from a point of attachment of the same to said inner member intermediate its ends, one end of said outer member being attached to said inner member only through a portion of said means, insulating material forming a part of said heat baffling means between said attachment points for said means to said members.

19. A heat exchange unit to be embedded in a contact mass for controlling chemical reactions comprising inner and outer nested conduits in spaced relation, and means progressively modifying the heat exchange between said conduits while maintaining the space therebetween substantially uniform throughout the length of said unit.

20. A heat exchange unit comprising inner and outer conduits in nested arrangement providing a space therebetween, series of spaced overlapping baffles encircling said inner member, and insulating material filling the space between certain of said baffles.

21. A heat exchange unit comprising inner and outer conduits in nested arrangement providing a space therebetween, means connecting the upper end of one of said conduits to an intermediate portion of the other conduit, and heat baffling means within said space extending above and below the point of attachment of said means to said inner conduit.

22. A heat exchange unit comprising inner and outer conduits in nested arrangement providing a space therebetween, means connecting the upper end of one of said conduits to an intermediate portion of the other conduit, heat baffling means within said space extending above and below the point of attachment of said means to said inner conduit, and insulating material forming a part of said heat baffling means.

23. A heat exchange unit comprising inner and outer conduits in nested arrangement providing a space therebetween, means connecting the upper end of one of said conduits to an intermediate portion of the other conduit, and stepped heat baffling means within said space extending above and below the point of attachment of said means to said inner conduit.

24. A heat exchange unit comprising inner and outer conduits in nested arrangement providing a space therebetween, means connecting the upper end of one of said conduits to an intermediate portion of the other conduit, and stepped and laterally spaced heat baffling means within said space extending above and below the point of attachment of said means to said inner conduit.

25. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, and insulating material filling said sleeve.

26. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, and baffles within said sleeve extending from the steps thereof in parallel relation to said inner conduit.

27. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, and a baffle extension on said sleeve beyond its point of attachment to said inner conduit projecting over the latter.

28. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, a baffle extension on said sleeve beyond its point of attachment to said inner conduit projecting over the latter, and insulating material filling said sleeve.

29. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, baffles within said sleeve extending from the steps thereof in parallel relation to said inner conduit, and insulating material filling the spaces between certain of said baffles.

30. A heat exchange unit adapted to be embedded in a contact mass comprising inner and outer conduits in nested arrangement providing a space therebetween, the inner open end of the inner conduit being adjacent the lower substantially closed end of the outer conduit, a stepped sleeve encircling said inner conduit and progressively reducing the space between said conduits in the direction remote from said open end of said inner conduit, said sleeve closing said remote end of said outer conduit and connected to an intermediate portion of said inner member, and tubular baffles on said sleeve extending rearwardly and forwardly of its point of attachment to said inner conduit.

31. A heat exchange unit adapted to be embedded in a contact mass comprising inner and outer conduits in nested spaced arrangement, the inner conduit terminating adjacent the lower closed end of the outer conduit to serve as an inlet or an outlet for fluid, and a substantially conical member joining the upper end of the outer conduit to the lower end of the inner conduit and progressively modifying the space between said conduits.

32. A heat exchange unit adapted to be embedded in a contact mass comprising inner and outer conduits in nested spaced arrangement, the inner conduit terminating adjacent the lower closed end of the outer conduit to serve as an inlet or an outlet for fluid, and a substantially conical member joining the upper end of the outer conduit to the lower end of the inner conduit, and heat baffling means within said member and between it and said inner conduit.

33. A heat exchange unit adapted to be embedded in a contact mass comprising inner and outer conduits in nested spaced arrangement, the inner conduit terminating adjacent the lower closed end of the outer conduit to serve as an inlet or an outlet for fluid, and a substantially conical member joining the upper end of the outer conduit to the lower end of the inner conduit, and insulating material at least partly filling the space within said member between it and said inner conduit.

34. A heat exchange unit adapted to be embedded in a contact mass comprising inner and outer conduits in nested spaced arrangement, the inner conduit terminating adjacent the lower closed end of the outer conduit to serve as an inlet or an outlet for fluid, and conical baffle members flaring outwardly from said inner conduit at spaced intervals into the space between said conduits, one of said members serving to connect said inner member to the upper end of said outer member.

35. A heat exchange unit to be embedded in a contact mass for controlling chemical reactions, both exothermic and endothermic, comprising inner and outer conduits in nested spaced arrangement, the inner conduit being of differential size and terminating adjacent the lower closed end of said outer conduit, and heat baffling means of varying effectiveness between said conduits but restricting the space between the latter to an equal amount throughout the length of said unit.

36. A heat exchange unit to be embedded in a contact mass for controlling chemical reactions, both exothermic and endothermic, comprising inner and outer conduits in nested spaced arrangement, said outer conduit being perforated at intervals but of uniform size, said inner conduit increasing in size in definite steps as the lower end of said outer conduit is approached, and means on the increased diameter part of said inner conduit for restricting both the heat transfer and the space between the conduits.

37. A heat exchange unit to be embedded in a contact mass for controlling chemical reactions, both exothermic and endothermic, comprising inner and outer conduits in nested spaced arrangement, said outer conduit being perforated at intervals but of uniform size, said inner conduit increasing in size in definite steps as the lower end of said outer conduit is approached, means interconnecting said conduits and reducing the space therebetween to uniform size, insulating material being utilized at least in part to reduce the space about the smaller diameter portions of said inner conduit and to restrict heat exchange between the conduits.

38. A heat exchange and fluid distributing unit adapted to be embedded in a contact mass comprising an inner supply conduit and an outer perforated tubular member, said member and said conduit being in nested arrangement to provide an annular space therebetween, means in said space interconnecting said conduit and said member, said conduit extending beyond said member at one end of said unit, and an extension of restricted diameter on said means for securing said unit in place.

39. A heat exchange unit adapted to be embedded in a contact mass comprising inner and outer conduits in nested spaced arrangement, the inner conduit terminating adjacent the lower closed end of the outer conduit but extending beyond the other end of said outer conduit, a member closing the upper end of said outer conduit and connecting with an intermediate portion of said inner conduit, and a nipple of reduced diameter projecting from said member in spaced encircling relation with the extended part of said inner conduit for mounting said unit in place.

40. Apparatus for effecting chemical reactions comprising in combination a casing providing a reaction chamber containing a contact mass, a top header for said chamber having an opening therethrough, a fluid conducting unit embedded in said mass, said unit comprising an inner conduit and an outer perforated conduit in spaced telescoping relation with said inner conduit, means in said space interconnecting said conduits and modifying the heat transfer between the same, and an extension on said means in said header opening for supporting said unit in place, said extension being of reduced diameter but greater than that of said inner conduit.

41. Apparatus for effecting chemical reactions comprising in combination a casing providing a reaction chamber containing a contact mass, a top header for said chamber having an opening therethrough, a fluid conducting unit embedded in said mass, said unit comprising an inner conduit and an outer perforated conduit in spaced telescoping relation with said inner conduit, means in said space interconnecting the upper end of said outer conduit and an intermediate portion of said inner conduit, heat baffling means in said space and associated with said first named means for progressively checking heat transfer by radiation between said conduits as the upper end of said unit is approached, and an extension of reduced diameter projecting from said first named means for mounting said unit in said header opening.

42. Apparatus for effecting chemical reactions comprising in combination a casing providing a reaction chamber containing a contact mass, a top header for said chamber having an opening therethrough, a fluid conducting unit embedded in said mass, said unit comprising inner and outer conduits in nested spaced relation, said inner conduit extending beyond said outer conduit at one end of said unit, means in the space between said conduits interconnecting the latter and effecting progressive or stepped modification of the transfer of heat between said conduits, an extension in said means in the form of a nipple in spaced encircling relation to the extended end of said inner conduit secured in said opening in said top header for supporting said unit in place, a gasket at the lower end of said nipple, and a layer of heat insulating material on said top header and filling the space within said nipple about said inner conduit.

43. Apparatus for effecting chemical reactions comprising in combination a casing providing a reaction chamber containing a contact mass, a top header for said chamber having an opening therethrough, a fluid conducting unit embedded in said mass, said unit comprising inner and outer conduits in nested spaced relation, said inner conduit extending beyond said outer conduit at one end of said unit, means in the space between said conduits for effecting progressive modification of the transfer of heat between said conduits including a stepped sleeve interconnecting said conduits, a nipple extending from said sleeve in spaced relation to said inner conduit and secured in said opening in said top header for supporting said unit in place, and heat insulating material filling said stepped sleeve and said nipple and forming a layer upon said top header.

JAMES W. HARRISON.

CERTIFICATE OF CORRECTION.

Patent No. 1,987,933.                                              January 15, 1935.

JAMES W. HARRISON.

It is hereby certified that error appears in the printed specification of the above numbered patent requiring correction as follows: Page 4, second column, lines 11 and 12, claim 15, strike out the comma and word ", stage" and insert instead substantially throughout its length, and staged; and that the said Letters Patent should be read with this correction therein that the same may conform to the record of the case in the Patent Office.

Signed and sealed this 19th day of March, A. D. 1935.

Leslie Frazer (Seal)                                                    Acting Commissioner of Patents.